(12) United States Patent
Schmucker et al.

(10) Patent No.: US 9,523,021 B2
(45) Date of Patent: Dec. 20, 2016

(54) WATERBORNE COATING COMPOSITIONS FOR SOFT TOUCH COATINGS

(71) Applicant: PPG Industries Ohio, Inc., Cleveland, OH (US)

(72) Inventors: Colin O. Schmucker, Pittsburgh, PA (US); Steven Bowles, Pittsburgh, PA (US); Irina Schwendeman, Wexford, PA (US); Venkateshwarlu Kalsani, Gibsonia, PA (US); Sarah K. Frye, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 32 days.

(21) Appl. No.: 14/261,746

(22) Filed: Apr. 25, 2014

(65) Prior Publication Data

US 2015/0307738 A1 Oct. 29, 2015

(51) Int. Cl.
| | |
|---|---|
| *C09D 175/04* | (2006.01) |
| *C08G 18/48* | (2006.01) |
| *C08G 18/61* | (2006.01) |
| *C08G 18/66* | (2006.01) |
| *C08G 18/72* | (2006.01) |
| *C08G 18/73* | (2006.01) |
| *C08G 18/75* | (2006.01) |
| *C08G 18/10* | (2006.01) |
| *C09D 175/08* | (2006.01) |
| *C08G 18/34* | (2006.01) |

(52) U.S. Cl.
CPC ............. *C09D 175/04* (2013.01); *C08G 18/10* (2013.01); *C08G 18/348* (2013.01); *C08G 18/4854* (2013.01); *C08G 18/61* (2013.01); *C08G 18/6692* (2013.01); *C08G 18/722* (2013.01); *C08G 18/73* (2013.01); *C08G 18/755* (2013.01); *C09D 175/08* (2013.01)

(58) Field of Classification Search
CPC ......... C08G 18/10; C08G 18/61; C08G 18/73; C08G 18/348; C08G 18/722; C08G 18/755; C08G 18/3231; C08G 18/4854; C08G 18/6692; C09D 175/04; C09D 175/08

USPC ............................ 428/423.1; 528/25, 28, 44
See application file for complete search history.

(56) References Cited

U.S. PATENT DOCUMENTS

| | | | |
|---|---|---|---|
| 5,656,701 A | 8/1997 | Miyamoto et al. | |
| 5,660,890 A | 8/1997 | Rudy et al. | |
| 6,455,631 B1 | 9/2002 | Blum et al. | |
| 6,613,314 B1 * | 9/2003 | Rollat et al. | 424/70.1 |
| 7,241,830 B2 * | 7/2007 | Kania et al. | 524/501 |
| 7,342,068 B2 | 3/2008 | Klingenberg et al. | |
| 8,415,421 B2 * | 4/2013 | Tarao et al. | 524/507 |
| 2006/0141264 A1 | 6/2006 | Rearick | |
| 2006/0167178 A1 * | 7/2006 | Kitamura et al. | 524/833 |
| 2006/0293468 A1 | 12/2006 | Rische et al. | |
| 2007/0211126 A1 * | 9/2007 | Bauer | C09D 11/54 347/100 |
| 2010/0092766 A1 | 4/2010 | Stine et al. | |
| 2010/0267861 A1 * | 10/2010 | Iben | C08G 18/10 523/157 |
| 2014/0147632 A1 | 5/2014 | Muenter | |

FOREIGN PATENT DOCUMENTS

| | | |
|---|---|---|
| CN | 102702953 A | 10/2012 |
| CN | 103059703 A | 4/2013 |
| DE | 102005029626 A1 | 1/2007 |
| DE | 102011107873 A1 | 1/2013 |
| EP | 1040875 B1 | 9/2007 |
| JP | 200784730 A | 4/2007 |
| JP | 4953355 B2 | 6/2012 |
| JP | 5035742 B2 | 9/2012 |
| WO | WO 2004060949 A1 | 7/2004 |
| WO | 2005105425 A2 | 11/2005 |
| WO | 2010015494 A2 | 2/2010 |

* cited by examiner

Primary Examiner — Thao T Tran
(74) Attorney, Agent, or Firm — Justin P. Martinchek

(57) ABSTRACT

A waterborne coating composition includes an aqueous polyurethane resin, a reactive silicone component, and a crosslinker. The aqueous polyurethane resin can have urethane linkages, hydrazinecarboxamide linkages, and reactive hydrazide functional groups. The polyurethane resin can have a glass transition temperature of less than 25° C. Methods of preparing waterborne coating compositions and substrates at least partially coated with waterborne coating compositions are also disclosed.

24 Claims, No Drawings

WATERBORNE COATING COMPOSITIONS FOR SOFT TOUCH COATINGS

FIELD OF THE INVENTION

The present invention relates to waterborne coating compositions for producing soft touch coatings, methods of preparing waterborne coating compositions, and substrates at least partially coated with soft touch coatings deposited from the waterborne coating compositions.

BACKGROUND OF THE INVENTION

Coatings applied to surfaces of consumer products, automotive interiors, and the like are often designed to have a soft touch or feel. It is also important that these coatings exhibit good chemical and mechanical resistance. Improving the chemical and mechanical resistance of soft touch coatings can be achieved by increasing the crosslink density and/or hardness of the coatings, such as by using a higher proportion of crosslinker and/or by employing binders having a higher hardness and/or a higher proportion of crosslinkable functional groups. However, improvement of the chemical and mechanical resistance by increasing the crosslink density and/or hardness of the coatings is often accompanied by a deterioration of the soft touch properties. As such, it can be difficult to obtain a soft touch coating that also exhibits good chemical and mechanical resistance.

Further, most soft touch coatings currently available are solvent-based. However, solvent-based coatings often release large amounts of volatile organic compounds (VOCs) into the environment. Because of the environmental damage that can be caused from VOCs, there are various regulations that limit the use of solvent-based coatings. In contrast, water-based soft touch coatings are not limited by such regulations, and, therefore, can be used for a wider range of applications.

SUMMARY OF THE INVENTION

In certain embodiments, the present invention is directed to a waterborne coating composition comprising an aqueous polyurethane resin, a reactive silicone component, and a crosslinker, wherein the aqueous polyurethane resin comprises urethane linkages, hydrazinecarboxamide linkages, and reactive hydrazide functional groups. The aqueous polyurethane resin also has a glass transition temperature (Tg) of less than 25° C.

In certain embodiments, the present invention is also directed to a method of preparing a waterborne coating composition comprising: mixing a diol or polyol and an isocyanate to form an isocyanate functional polyurethane resin; mixing, in an aqueous medium, the isocyanate functional polyurethane resin and adipic acid dihydrazide to form an aqueous polyurethane resin comprising urethane linkages, hydrazinecarboxamide linkages, and reactive hydrazide functional groups; mixing a reactive silicone component with the aqueous polyurethane resin; and combining the mixture of the reactive silicone component and aqueous polyurethane resin with a crosslinker. The aqueous polyurethane resin can also have a glass transition temperature of less than 25° C.

In certain embodiments, a substrate is at least partially coated with the waterborne coating compositions described herein.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" polyurethane resin, "a" crosslinker, "a" urethane linkage, "a" hydrazinecarboxamide linkage, "a" hydrazide functional group, "a" reactive silicone component, "a" flatting agent, and the like refer to one or more of any of these items.

In certain embodiments, the present invention is directed to a waterborne coating composition. As used herein, the term "waterborne" refers to coating compositions in which the solvent for the coating compositions is an aqueous solvent comprising more than 50 weight % water, based on the total weight of the solvent. In certain embodiments, the solvent for the coating compositions comprises more than 60 weight % water, or more than 70 weight % water, or more than 80 weight % water, or more than 90 weight % water, based on the total weight of the solvent. The solvent for the waterborne coating compositions can also include an organic solvent or solvents mixed with water. Non-limiting examples of organic solvents that can be used include glycols, glycol ether alcohols, alcohols, ketones, glycol diethers, and diesters. Other non-limiting examples of organic solvents include aromatic and aliphatic hydrocarbons.

As will be described in further detail, the waterborne coating compositions of the present invention can be used to form coatings that have a particular "touch feel," for example, it is often desired to have a coating with a "soft feel" or "soft touch." As used herein, "soft touch coatings" refer to coatings that can impart a range of touch feel, for example, a velvety touch or feel, a silky touch or feel, or a rubbery touch or feel, to a substrate. Soft touch coatings formed from the waterborne coating compositions of the present invention also exhibit good chemical and mechanical resistance as well as other properties desired in a coating.

In certain embodiments, the waterborne coating compositions comprise an aqueous polyurethane resin or polymer. As used herein, a "polymer" refers to oligomers and both homopolymers and copolymers, and the prefix "poly" refers to two or more. The term "resin" is used interchangeably with "polymer." Further, an "aqueous" polyurethane resin refers to a polyurethane that is dissolved or dispersed in an aqueous solvent as defined herein.

In certain embodiments, the aqueous polyurethane resin comprises urethane linkages, hydrazinecarboxamide linkages, and reactive hydrazide functional groups. As used herein, "urethane linkage" refers to a urethane moiety (—O—C(O)—NH —) found in the backbone of the polyurethane resin, and the term "hydrazinecarboxamide linkage" refers to a hydrazinecarboxamide moiety represented by Chemical Formula (I) that is found in the backbone of the polyurethane resin:

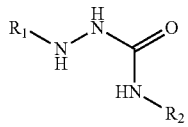

Chemical Formula (I)

where $R_1$ and $R_2$ are independently selected from an alkyl group or an aryl group.

The term "alkyl" refers to a saturated hydrocarbon chain. The alkyl groups may include a specified number of carbon atoms. For example, $C_1$-$C_{12}$ alkyl indicates that the alkyl group may have 1, 2, 3, 4, 5, 6, 7, 8, 9, 10, 11, or 12 carbon atoms. In certain embodiments, the alkyl group may be a $C_1$-$C_{12}$ alkyl group, a $C_1$-$C_{10}$ alkyl group, a $C_1$-$C_8$ alkyl group, a $C_1$-$C_6$ alkyl group, or a $C_1$-$C_4$ alkyl group. Further, the term "aryl" refers to a group derived from an aromatic group containing a single aromatic ring or multiple aromatic rings that are fused together, directly linked, or indirectly linked. The term "aromatic" refers to a cyclically conjugated hydrocarbon with a stability (due to delocalization) that is significantly greater than that of a hypothetical localized structure. Non-limiting examples of aryl groups include phenyl, naphthyl, biphenyl, diphenylether, diphenylamine, benzophenone, and mixtures thereof.

As used herein, the term "reactive hydrazide functional group" refers to a hydrazide moiety that can serve as a site of chemical reactivity on a molecule such as on the polyurethane resin where a chemical bond can be formed with another molecule. A "hydrazide moiety" refers to a molecule having a nitrogen to nitrogen covalent bond with 4 substituents with at least one of them being an acyl group (R—C=O— where R represents an organic group such as an alkyl group that is attached to the CO group by a single covalent bond) and which is represented as Chemical Formula (II):

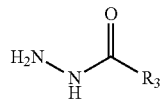

Chemical Formula (II)

where $R_3$ represents an organic group such as an alkyl group as defined above that is attached to the CO group by a single covalent bond. As such, in certain embodiments, it is appreciated that the reactive hydrazide functional groups on the polyurethane resin can be represented and calculated as $H_2N$—$NH$—$C(O)$ with a weight average molecular weight of 59 g/mol.

In certain embodiments, the aqueous polyurethane resin can comprise from 1 to 10 weight % of reactive hydrazide functional groups based on the total solid weight of the polyurethane resin where the reactive hydrazide functional groups are represented and calculated as $H_2N$—$NH$—$C(O)$ with a weight average molecular weight of 59 g/mol. In some of these embodiments, the aqueous polyurethane resin can comprise from 2 to 8 weight % of reactive hydrazide functional groups, or from 2 to 4 weight % of reactive hydrazide functional groups, based on the total solid weight of the polyurethane resin. As used herein, "total solid weight" refers to the total amount of non-volatile components even though some of the components may be non-volatile liquids rather than solids at room temperature.

Further, in certain embodiments, the reactive functional groups present on the aqueous polyurethane resin consist entirely of reactive hydrazide functional groups. As such, in certain embodiments, the aqueous polyurethane resin may be substantially free, may be essentially free, or may be completely free of all other reactive functional groups except for the reactive hydrazide functional groups. As used herein, "reactive functional group" refers to an atom or group of atoms that can be reacted to form a chemical bond with an atom or group of atoms that are not part of the reactive functional group. The term "substantially free" as used in this context means the aqueous polyurethane resin contains less than 1000 parts per million (ppm), "essentially free" means less than 100 ppm, and "completely free" means less than 20 parts per billion (ppb) of all other reactive functional groups except for the reactive hydrazide functional groups. For example, the aqueous polyurethane resin may be substantially free, may be essentially free, or may be completely free of reactive hydroxyl (OH) functional groups.

In certain embodiments, the aqueous polyurethane resin can be prepared from a mixture of reactants comprising a diol or polyol, an isocyanate, and adipic acid dihydrazide. As used herein, a "diol" refers to a compound comprising two hydroxyl (OH) functional groups, and a polyol refers to a compound comprising three or more hydroxyl (OH) functional groups. In certain embodiments, the diol or polyol has a weight average molecular weight of 50 to 3,000 g/mol, as determined by standard gel permeation chromatography. In some of these embodiments, the diol or polyol has a weight average molecular weight of 800 to 1,200, or from 1,800 to 2,200 g/mol.

Non-limiting examples of diols and polyols that can be used to prepare the aqueous polyurethane resin include polyether polyols, polycaprolactones, hydroxyl-functional polybutadienes, polydialkylsilane diols, (meth)acrylic polyols, and mixtures thereof. As used herein, "(meth)acrylic" refers to acrylic and methacrylic.

In certain embodiments, the diol or polyol comprises from 50 to 90 weight %, based on the total solid weight of the reactants used to prepare the aqueous polyurethane resin. In some of these embodiments, the diol or polyol comprises from 60 to 80 weight %, or from 65 to 75 weight %, based on the total solid weight of the reactants used to prepare the aqueous polyurethane resin.

In certain embodiments, the isocyanate comprises from 10 to 40 weight %, or from 20 to 30 weight %, or from 22 to 28 weight %, based on the total solid weight of the reactants used to prepare the aqueous polyurethane resin. Further, in certain embodiments, the adipic acid dihydrazide comprises from 1 to 10 weight %, or from 2 to 8 weight %, or from 3 to 5 weight %, based on the total solid weight of the reactants used to prepare the aqueous polyurethane resin.

The mixture of reactants used to prepare the aqueous polyurethane resin can further comprise a dihydroxyfunctional carboxylic acid. A "dihydroxyfunctional carboxylic acid" refers to a carboxylic acid having two functional hydroxyl (OH) groups. Non-limiting examples of dihydroxyfunctional carboxylic acids that can be used to prepare the aqueous polyurethane resin include 2,2-bis(hydroxymethyl)propionic acid, 2,2-bis(hydroxymethyl)butyric acid, and mixtures thereof. In certain embodiments, the dihydroxyfunctional carboxylic acid comprises from 1 to 10 weight %, or from 3 to 8 weight %, or from 4 to 7 weight %, based on the total solid weight of the reactants used to prepare the aqueous polyurethane resin.

In certain embodiments, the ratio of adipic acid dihydrazide equivalents to free isocyanate equivalents comprises from 1.01:1 to 1.5:1. In some of these embodiments, the ratio of adipic acid dihydrazide equivalents to free isocyanate equivalents comprises from 1.3:1 to 1.4:1, or from 1.2:1 to 1.3:1. The ratios of adipic acid dihydrazide equivalents to free isocyanate equivalents help produce an aqueous polyurethane resin comprising urethane linkages, hydrazinecarboxamide linkages, and hydrazide functional groups that can be used to form soft touch coatings with good chemical and mechanical resistance. The ratios of adipic acid dihydrazide equivalents to free isocyanate equivalents also prevent the aqueous polyurethane resin from gelling.

Further, in certain embodiments, the aqueous polyurethane resin has a weight average molecular weight of 20,000 to 70,000 g/mol, as determined by standard gel permeation chromatography. In some of these embodiments, the aqueous polyurethane resin has a weight average molecular weight of 24,000 to 40,000 g/mol, or a weight average molecular weight of 55,000 to 70,000 g/mol.

In certain embodiments, the aqueous polyurethane resin has an acid value of less than 40 mg KOH/g, as measured by the amount of KOH in milligrams required to neutralize a gram of the resin composition. In some of these embodiments, the aqueous polyurethane resin has an acid value of less than 30 mg KOH/g, or less than 25 mg KOH/g.

The aqueous polyurethane resin can also have a glass transition temperature of less than 25° C., as determined by differential scanning calorimetry. In some of these embodiments, the aqueous polyurethane resin can have a glass transition temperature of less than 0° C., or less than −20° C. It was found that coatings produced with aqueous polyurethane resins having a glass transition temperature below 25° C. exhibit a softer and more pleasant feeling as compared to coatings produced with aqueous polyurethane resins having a glass transition temperature above 25° C.

As indicated, the aqueous polyurethane resin can be combined with a reactive silicone component, a crosslinker and/or other components such as a flatting agent to form the waterborne coating compositions described herein. In such embodiments, the aqueous polyurethane resin can comprise from 40 to 90 weight % of the coating composition based on the total solid weight of the coating composition. In some of these embodiments, the aqueous polyurethane resin can comprise from 50 to 60 weight %, or from 70 to 80 weight % of the coating composition based on the total solid weight of the coating composition.

In certain embodiments, the waterborne coating composition also includes a reactive silicone component. As used herein, a "reactive silicone component" refers to a resin comprising primarily silicone-containing polymers wherein the silicone-containing polymers contain at least one reactive functional group. In certain embodiments, the reactive functional group of the reactive silicone component is chosen to react with a crosslinker. In certain embodiments, the reactive silicone component can be a reactive silicone emulsion. As used herein, a "reactive silicone emulsion" refers to an emulsion of a resin in water comprising primarily silicone-containing polymers wherein the silicone-containing polymers contain at least one reactive functional group.

Non-limiting examples of reactive silicone components that can be used to prepare the waterborne coating compositions described herein include polydimethylsiloxane, silicone glycol, silicone polyether, dimethicone polyols, amino modified silicones, and mixtures thereof. Further, non-limiting examples of reactive functional groups that can be present on the reactive silicone component include amine groups, hydroxyl groups, isocyanate groups, and mixtures thereof. Such reactive silicone components can also be used as an emulsion.

It was found that the addition of a reactive silicone component helps decrease the coefficient of friction and surface roughness, which will be described in further detail below, of coatings formed from the coating compositions described herein. The reactive silicone component also improves the appearance of the final coatings. However, it was also found that the addition of too much of the reactive silicone component can result in surface failure such as orange-peeling or cratering.

In certain embodiments, the reactive silicone component comprises from 1 to 20 weight % of the coating composition based on the total solid weight of the coating composition. In some of these embodiments, the reactive silicone component comprises from 2 to 16 weight %, or from 4 to 12 weight %, or from 6 to 8 weight % of the coating composition based on the total solid weight of the coating composition.

The waterborne coating composition can also include a flatting agent. As used herein, the term "flatting agent" refers to a material added to a coating composition to reduce the gloss of a coating formed from the composition. The term "flatting agent" is interchangeable with the term "matting agent" The amount of flatting agent added to the formula depends on the desired final gloss level. In certain embodiments, flatting agent can be added to have a gloss of 0.1 to 20 gloss units measured at 60° C. by test method ASTM D523 using a BYK Micro-TRI-Gloss glossmeter.

Non-limiting examples of suitable flatting agents include metal hydroxides, metal oxides, silicas, pyrogenic silica, wax-treated silica, micronized wax, polyether condensate, polyamide microbeads, polyurethane microbeads, and mixtures thereof. When silica is used as a flatting agent with the coating composition, it can be used in various forms including, but not limited to, amorphous, aerogel, diatomaceous, hydrogel, fumed, and mixtures thereof.

In certain embodiments, the waterborne coating compositions can also include a crosslinker. As used herein, the term "crosslinker" refers to a molecule comprising two or more functional groups that are reactive with other functional groups and which is capable of linking two or more monomers or polymer molecules through chemical bonds. In certain embodiments, the functional groups of the crosslinker are reactive with functional groups of the aqueous polyurethane resin, such as the hydrazide functional groups for example. It will be appreciated that the coatings of the present invention can cure through the reaction between the functional groups of the aqueous polyurethane resin and the functional groups of the crosslinkers. "Curing" refers to bond formation between the aqueous polyurethane resin and crosslinker resulting in the formation of a crosslinked coating. Curing may occur upon application of an external stimulus including, but not limited to, heat.

Non-limiting examples of crosslinkers include phenolic resins, amino resins, epoxy resins, beta-hydroxy (alkyl) amide resins, alkylated carbamate resins, isocyanates, polyacids, anhydrides, organometallic acid-functional materials, polyamines, polyamides, aminoplasts, and mixtures thereof.

Non-limiting examples of isocyanates include multifunctional isocyanates. Examples of multifunctional polyisocyanates include aliphatic diisocyanates such as hexamethylene diisocyanate and isophorone diisocyanate, and aromatic diisocyanates such as toluene diisocyanate and 4,4'-diphenylmethane diisocyanate. The polyisocyanates can be blocked or unblocked. Examples of other suitable polyisocyanates include isocyanurate trimers, allophanates, and uretdiones of diisocyanates and polycarbodiimides such as those disclosed in U.S. Pat. No. 8,389,113, incorporated by reference in pertinent part herein. Suitable polyisocyanates are well known in the art and widely available commercially including, but not limited to, those commercially available under the trade names Bayhydur® and Desmodur® from Bayer Corporation.

Non-limiting examples of aminoplasts include condensates of amines and/or amides with aldehyde. The most common amines or amides are melamine, urea, or benzoguanamine. For example, the condensate of melamine with formaldehyde is a suitable aminoplast. However, condensates with other amines or amides can be used; for example, aldehyde condensates of glycoluril. While the aldehyde used is most often formaldehyde, other aldehydes such as acetaldehyde, crotonaldehyde, and benzaldehyde may be used.

The aminoplast contains methylol groups and at least a portion of these groups may be etherified with an alcohol to modify the cure response. Any monohydric alcohol may be employed for this purpose including methanol, ethanol, butanol, and hexanol. Non-limiting examples of commercially available aminoplasts that can be used include CYMEL® 303, CYMEL® 322, CYMEL® 327, CYMEL® 380, and CYMEL® 1130 (available from CYTEK Industries and/or ALLNEX).

In certain embodiments, the crosslinker comprises from 0.01 to 35 weight % of the coating composition based on the total solid weight of the coating composition. In some of these embodiments, the crosslinker comprises from 1 to 30 weight %, or from 10 to 25 weight %, or from 15 to 20 weight % of the coating composition based on the total solid weight of the coating composition.

It will be appreciated that the aqueous polyurethane resin of the present invention can form all or part of the film-forming resin of the coating composition. In certain embodiments, one or more additional film-forming resins are also used in the coating composition. For example, the coating compositions can comprise any of a variety of thermoplastic and/or thermosetting compositions known in the art. Thermosetting or curable coating compositions typically comprise film forming polymers or resins having functional groups that are reactive with either themselves or a crosslinker.

The additional film-forming resin can be selected from, for example, polyurethanes that are the same or different than those described above, acrylic polymers, polyester polymers, polyamide polymers, polyether polymers, polysiloxane polymers, polyepoxy polymers, epoxy resins, vinyl resins, copolymers thereof; and mixtures thereof. In certain embodiments, the additional resin is selected from a polyester, polyether, polyurethane, polyurea, polydialkylsilane, polybutadiene, polyacrylate, and mixtures thereof. Generally, these polymers can be any polymer of these types made by any method known to those skilled in the art. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups), and combinations thereof. Appropriate mixtures of film-forming resins may also be used in the preparation of the present coating compositions.

Thermosetting coating compositions typically comprise a crosslinker that may be selected from any of the crosslinkers described above or known in the art to react with the functionality used in the coating compositions. In certain embodiments, the present coatings comprise a thermosetting film-forming polymer or resin and a crosslinker and the crosslinker is either the same or different from the crosslinker that is used to crosslink the aqueous polyurethane resin described herein. In certain other embodiments, a thermosetting film-forming polymer or resin having functional groups that are reactive with themselves are used; in this manner, such thermosetting polymers are self-crosslinking.

In certain embodiments, the waterborne coating composition includes an additional film-forming resin that comprises from 1 to 50 weight % of the coating composition based on the total solid weight of the coating composition. In some of these embodiments, the additional film-forming resin comprises from 2 to 40 weight %, or from 3 to 30 weight %, or from 5 to 20 weight %, or from 8 to 10 weight % of the coating composition, based on the total solid weight of the coating composition.

The coating compositions of the present invention can also include other optional materials. For example, in certain embodiments, the waterborne coating compositions also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, and perylene and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

Other non-limiting examples of materials that can be used with the coating compositions of the present invention include plasticizers, abrasion resistant particles, corrosion resistant particles, corrosion inhibiting additives, fillers including, but not limited to, micas, talc, clays, and inorganic minerals, anti-oxidants, hindered amine light stabilizers, UV light absorbers and stabilizers, surfactants, flow and surface control agents, thixotropic agents, organic cosolvents, reactive diluents, catalysts, reaction inhibitors, and other customary auxiliaries.

In certain embodiments, the coating compositions include pigment particles that may comprise from 1 to 10 weight %, or from 1 to 8 weight %, or from 5 to 8 weight % based on total solid weight of the coating compositions.

The coatings of the present invention can be applied to a wide range of substrates known in the coatings industry. For example, the coatings of the present invention can be applied to automotive substrates, industrial substrates, packaging substrates, wood flooring and furniture, apparel, electronics, including housings and circuit boards, glass and transparencies, sports equipment, including golf balls, and the like. These substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylonitrile butadiene styrene (PC/ABS), polyamide, wood, veneer, wood composite, particle board, medium density fiberboard, cement, stone, glass, paper, cardboard, textiles, leather, both synthetic and natural, and the like.

In certain embodiments, the coatings of the present invention can be applied to plastic substrates found in automobile interiors and consumer electronic products. For example, the coatings of the present invention can be applied to plastic substrates found on instrument panels, door panels, arm rests, head rests, airbag covers, glove compartment covers, center consoles, laptops, tablets, cellular phones, other handheld electronic devices, and the like.

The coatings formed from the coating compositions of the present invention can be applied by any means standard in the art, such as electrocoating, spraying, electrostatic spraying, dipping, rolling, brushing, and the like. The coatings of the present invention can be applied to a dry film thickness of 0.1 mil to 5 mils, or from 0.5 mil to 3 mils, or from 1 mil to 1.25 mils, or from 2 mils to 2.25 mils.

The coating compositions of the present invention may also be used alone or in combination with primers and/or basecoats. A "primer coating composition" refers to coating compositions from which an undercoating may be deposited onto a substrate in order to prepare the surface for application of a protective or decorative coating system.

As indicated, the present invention is also directed to a method of preparing a waterborne coating composition. In certain embodiments, the method comprises mixing a diol or polyol and an isocyanate to form an isocyanate functional polyurethane resin. The isocyanate functional polyurethane resin can then be mixed in an aqueous medium with adipic acid dihydrazide to form an aqueous polyurethane resin comprising urethane linkages, hydrazinecarboxamide linkages, and reactive hydrazide functional groups, wherein the aqueous polyurethane resin has a glass transition temperature of less than 25° C. The method can further include dispersing a flatting agent in the aqueous polyurethane resin, mixing a reactive silicone component with the aqueous polyurethane resin, and combining the mixture of the reactive silicone component and aqueous polyurethane resin with a crosslinker.

The method can also comprise adding other materials. For example, in certain embodiments, the aqueous polyurethane resin can be also be prepared with a dihydroxyfunctional carboxylic acid. In addition, in certain embodiments, the aqueous polyurethane resin can be combined with at least one additional resin, a colorant, or a mixture thereof, all of which are described in detail above.

As indicated above, the waterborne coating compositions can be applied to a substrate and cured to form coatings that have a soft, smooth touch or feel. For example, in certain embodiments, coatings deposited from the waterborne coating compositions described herein have been found to exhibit: a Fischer microhardness of less than 15 N/mm$^2$, or less than 10 N/mm$^2$, or less than 8 N/mm$^2$, as measured by a Fischerscope HM2000 stylus microhardness instrument following the instruction described in the Fischerscope HM2000 Manual ("Fischer microhardness test"); a coefficient of friction ranging from 0.01 to 0.80, or from 0.01 to 0.5, or from 0.1 to 0.3, as measured by a Dynisco Polymer Test—1055 coefficient of friction tester utilizing a felt contact according to ASTM Method D1894; and/or a surface roughness of 1 micro-inch to 60 micro-inches, or from 10 micro-inches to 40 micro-inches, or from 20 micro-inches to 30 micro-inches, as measured by a Taylor Hobson Precision Surtronic Duo profilometer following the instruction described in the Taylor Hobson Precision Surtronic Duo Manual ("surface roughness test"). As used herein, "Fischer microhardness" refers to the hardness of a material to deformation, "coefficient of friction" refers to the ratio of the force that maintains contact between an object and a surface and the frictional force that resists the motion of the object, and "surface roughness" refers to the texture of a surface such as the texture of a surface of a coating that is quantified by the vertical deviations of the surface from its ideal form.

In addition to a soft feel, coatings deposited from the waterborne coating compositions exhibit good chemical and mechanical resistance. For example, in certain embodiments, the coatings can resist 50 double-rubs of methyl ethyl ketone (MEK) at a dry film thickness of 50 μm in accordance with ASTM D5402. The coatings were also able to easily withstand more than 50 cycles of an abrasive medium at a dry film thickness of 50 μm in accordance with ASTM F2357. Thus, the waterborne coating compositions described herein can be applied to a substrate to form coatings that have a soft touch, good chemical and mechanical resistance, and other properties desired in a coating.

The following examples are presented to demonstrate the general principles of the invention. The invention should not be considered as limited to the specific examples presented. All parts and percentages in the examples are by weight unless otherwise indicated.

EXAMPLE 1

Preparation of a Polyurethane Resin

A polyurethane resin comprising urethane linkages, hydrizinecarboxamide linkages, and hydrazide functional groups according to the present invention was prepared as follows.

In a glass four-neck round bottom flask reactor, 212.5 grams of TERATHANE® 2000 (polytetramethylene ether glycol having a molecular weight between 1,900 and 2,100 g/mol, commercially available from Invista Specialty Chemicals) and dimethylol propionic acid were mixed together under continuous agitation and in the presence of nitrogen. The reaction mixture was gradually heated to 60° C. to melt/dissolve the mixture. After melting/dissolving the mixture, 35.7 grams of isophorone diisocyanate and 27.1 grams of hexamethylene diisocyanate were added to the mixture over a period of about 20 minutes and then rinsed with 99.8 grams methyl ethyl ketone. About 0.16 gram of dibutyl tin dilaurate was added to the mixture, which was then heated to 80° C. The reaction was monitored until an isocyanate (NCO) equivalent weight of about 2711.7 was obtained. A solution prepared from 13.03 grams of dimethyl ethanol amine and 79.22 grams of adipic acid dihydrazide in 496.3 grams of deionized water was preheated to 45° C. The solution was added to the reaction mixture over a 20 minute period while maintaining the temperature between 48° C. and 52° C. and rinsed with 105.9 grams of deionized water. After adding the solution to the reaction mixture, the temperature was held between 48° C. and 52° C. for 30 minutes, and 0.04 gram of BYK®-011 (Silicone-free defoamer for aqueous coating systems, commercially free from BYK Chemie) was added. The resulting polyurethane resin was cooled to room temperature and poured into a separate container. The resulting polyurethane resin had an acid value of 19.61 mg KOH/g, and a glass transition temperature of −78° C., as measured by digital scanning calorimetry. The polyurethane resin had 2.6 weight % of reactive hydrazide functional groups based on the total solid weight of the polyurethane resin, calculated as $H_2N—NH—C(O)$ with a weight average molecular weight of 59 g/mol.

EXAMPLE 2

Preparation of a Waterborne Coating Composition

A waterborne coating composition according to the present invention was prepared from the components shown in Table 1.

TABLE 1

| Components | Percent by Weight |
|---|---|
| Part A | |
| Polyurethane resin of Example 1 | 72 |
| BYK ®-011[1] | 0.3 |
| Disperbyk ®-190[2] | 0.3 |
| Acematt ® OK 520[3] | 3.5 |
| Water (deionized) | 12 |

TABLE 1-continued

| Components | Percent by Weight |
|---|---|
| Surfynol ® 104E[4] | 0.5 |
| Rheovis ® PU 1250[5] | 0.4 |
| Silres ® BS 1306[6] | 2 |
| Dow Corning ® 205SL[7] | 1 |
| Part B | |
| Rhodiasolv ® RPDE[8] | 6 |
| Bayhydur ® XP 2487/1[9] | 2 |

[1]Defoamer, commercially available from BYK.
[2]Dispersing additive, commercially available from BYK.
[3]Wax treated silica, commercially available from EVONIK.
[4]Nonionic wetting agent and molecular defoamer, commercially available from Air Products.
[5]Nonionic rheology modifier, commercially available from BASF.
[6]Modified polysiloxane emulsion, commercially available from WACKER.
[7]Silicone solution in solvent, commercially available from Dow Corning.
[8]Bio-based diester solvent, commercially available from Rhodia Group.
[9]Water dispersible aliphatic polyisocyanate based on hexamethylene diisocyanate (HDI), commercially available from Bayer Corporation.

The polyurethane resin of Example 1 was added to a lined metal paint can. BYK®-011, Disperbyk®-190, Acematt® OK 520, and 10% of the deionized water were slowly added and dispersed using a high-shear dispersing blade and an air mixer for 15 minutes. Silres® BS 1306 and Dow Corning® 205SL were slowly added with the remaining water and the Surfynol® 104E and Rheovis® PU 1250 were used to adjust the foam and viscosity before storage. Part B was combined with Part A prior to spray application, which is described below.

EXAMPLE 3

Preparation of a Waterborne Coating Composition

A waterborne soft touch coating according to the present invention was prepared from the components shown in Table 2.

TABLE 2

| Components | Percent by Weight |
|---|---|
| Part A | |
| Polyurethane resin of Example 1 | 48 |
| Polyester resin[10] | 24 |
| BYK ®-011[1] | 0.3 |
| Disperbyk ®-190[2] | 0.3 |
| Acematt ® OK 520[3] | 3.5 |
| Water (deionized) | 12 |
| Surfynol ® 104E[4] | 0.5 |
| Acrysol ™ ASE-60[11] | 0.4 |
| Silres ® BS 1360[12] | 2 |
| Tego ® Glide 410[13] | 1 |
| Part B | |
| Rhodiasolv ® RPDE[8] | 6 |
| Bayhydur ® XP 2487/1[9] | 2 |

[10]Polyester resin having ester linkages and hydroxyl functionality and a weight average molecular weight ranging from 20,000 to 60,000 g/mol.
[11]Anionic thickener, commercially available from Dow Chemical.
[12]Nonionic reactive silicone emulsion, commercially available from WACKER.
[13]Polyether siloxane copolymer, commercially available from EVONIK.

The polyurethane resin of Example 1 and the polyester resin were added to a lined metal paint can. BYK®-011, Disperbyk®-190, Acematt® OK 520, and 10% of the deionized water were slowly added and dispersed using a high-shear dispersing blade and an air mixer for 15 minutes. Silres® BS 1360, Tego® Glide 410, and the remaining water were slowly added, and Surfynol® 104E and Acrysol™

ASE-60 were used to adjust the foam and viscosity before storage. Part B was combined with Part A prior to spray application, which is described below.

EXAMPLE 4

Application and Evaluation of Waterborne Soft Touch Coatings

The waterborne coating compositions of Examples 2 and 3 were applied to PC/ABS substrates and cured at 60° C. for 30 minutes to form coatings according to the present invention. The physical and performance properties of each coating was then evaluated, the results of which are shown in Table 3.

TABLE 3

| Physical Property/Performance Test | Coating Formed from Example 2 | Coating Formed from Example 3 |
|---|---|---|
| Feel of Dry Film | Soft, Slippery Touch/Feel | Soft, Slippery Touch/Feel |
| Fisher Microhardness (N/mm$^2$)[14] | 8.71 | 4.8 |
| Coefficient of Friction[15] | 0.255 | 0.299 |
| Surface Roughness (micro-inches)[16] | 26 | 31 |
| RCA Abrasion Cycles until film failure[17] | 310 | 420 |
| MEK Double Rubs[18] | No Film Failure after 50 Rubs | No Film Failure after 50 Rubs |
| Gloss at 60°[19] | 4.1 | 3.7 |

[14]Measured by a Fischerscope HM2000 stylus microhardness instrument following the instruction described in the Fischerscope HM2000 Manual ("Fischer microhardness test"). Three measurements were conducted and the average value was recorded and reported.
[15]Measured by a Dynisco Polymer Test - 1055 coefficient of friction tester utilizing a felt contact according to ASTM Method D1894. Five tests were run on each sample. Five measurements were conducted and the average value was recorded and reported.
[16]Measured by a Taylor Hobson Precision Surtronic Duo profilometer following the instruction described in the Taylor Hobson Precision Surtronic Duo Manual ("surface roughness test"). Five tests were run on each sample. Five measurements were conducted and the average value was recorded and reported.
[17]Mechanical resistance test using cycles of an abrasive medium at a dry film thickness of 50 μm in accordance with ASTM F2357.
[18]Chemical resistance test using double-rubs of methyl ethyl ketone (MEK) at a dry film thickness of 50 μm in accordance with ASTM D5402.
[19]Measured by a BYK-Gardner Micro-TRI-Gloss glossmeter according to ASTM D523. As shown in Table 3, coatings formed from the compositions of Examples 2 and 3 had a soft, smooth surface with very little friction. As further shown in Table 3, coatings formed from the compositions of Examples 2 and 3 also exhibited good chemical and mechanical resistance.

Whereas particular embodiments of this invention have been described above for purposes of illustration, it will be evident to those skilled in the art that numerous variations of the details of the present invention may be made without departing from the invention as defined in the appended claims.

The invention claimed is:

1. A waterborne coating composition comprising:
   an aqueous polyurethane resin comprising urethane linkages, hydrazinecarboxamide linkages, and reactive hydrazide functional groups, wherein the aqueous polyurethane resin has a glass transition temperature of less than 25° C.;
   a reactive silicone component comprising at least one reactive functional group; and
   a crosslinker reactive with at least the hydrazide functional groups of the aqueous polyurethane resin and the at least one reactive functional group of the reactive silicone component.

2. The waterborne coating composition of claim 1, wherein the aqueous polyurethane resin comprises from 1 to 10 weight % of the reactive hydrazide functional groups based on the total solid weight of the aqueous polyurethane resin, wherein the reactive hydrazide functional groups are represented and calculated as $H_2N-NH-C(O)$ with a weight average molecular weight of 59 g/mol.

3. The waterborne coating composition of claim 1, wherein the reactive silicone component comprises a reactive silicone emulsion.

4. The waterborne coating composition of claim 1, further comprising a flatting agent.

5. The waterborne coating composition of claim 1, wherein the aqueous polyurethane resin is completely free of all other reactive functional groups except for the reactive hydrazide functional groups.

6. The waterborne coating composition of claim 1, wherein the aqueous polyurethane resin is prepared from a mixture of reactants comprising:
   a diol or polyol;
   an isocyanate; and
   adipic acid dihydrazide.

7. The waterborne coating composition of claim 6, wherein a ratio of adipic acid dihydrazide equivalents to free isocyanate equivalents ranges from 1.01:1 to 1.5:1.

8. The waterborne coating composition of claim 6, wherein the mixture of reactants further comprise a dihydroxyfunctional carboxylic acid.

9. The waterborne coating composition of claim 1, wherein the aqueous polyurethane resin has an acid value of less than 40 mg KOH/g.

10. The waterborne coating composition of claim 1, wherein the aqueous polyurethane resin has a weight average molecular weight of 20,000 to 70,000 g/mol.

11. The waterborne coating composition of claim 1, wherein the aqueous polyurethane resin has a glass transition temperature of less than 0° C.

12. The waterborne coating composition of claim 1, wherein when the waterborne coating composition is applied to a substrate and cured as a coating, the coating has a Fischer microhardness of less than 15 N/mm$^2$ as measured by the Fischer microhardness test, a coefficient of friction of 0.01 to 0.80 as measured by ASTM Method D1894, and a surface roughness of 1 micro-inch to 60 micro-inches as measured by the surface roughness test.

13. The waterborne coating composition of claim 1, further comprising at least one additional resin.

14. The waterborne coating composition of claim 1, wherein the reactive silicone component comprises from 1 to 20 weight % of the total solid weight of the coating composition.

15. The waterborne coating composition of claim 1, wherein the aqueous polyurethane resin comprises from 40 to 90 weight % of the waterborne coating composition based on the total solid weight of the waterborne coating composition.

16. A substrate at least partially coated with the coating composition of claim 1.

17. The at least partially coated substrate of claim 16, wherein the substrate comprises plastic.

18. A method of preparing a waterborne coating composition comprising:
   a) mixing a diol or polyol and an isocyanate to form an isocyanate functional polyurethane resin;
   b) mixing, in an aqueous medium, the isocyanate functional polyurethane resin and adipic acid dihydrazide to form an aqueous polyurethane resin comprising urethane linkages, hydrazinecarboxamide linkages, and reactive hydrazide functional groups, wherein the aqueous polyurethane resin has a glass transition temperature of less than 25° C.;

c) mixing a reactive silicone component comprising at least one reactive functional group with the aqueous polyurethane resin; and d) combining the mixture of the reactive silicone component and aqueous polyurethane resin with a crosslinker reactive with at least the hydrazide functional groups of the aqueous polyurethane resin and the at least one reactive functional group of the reactive silicone component.

19. The method of claim 18, further comprising dispersing a flatting agent in the aqueous polyurethane resin.

20. The method of claim 18, further comprising mixing the aqueous polyurethane resin with at least one additional resin.

21. The method of claim 18, wherein when the waterborne coating composition is applied to a substrate and cured as a coating, the coating has a Fischer microhardness of less than 15 N/mm$^2$ as measured by the Fischer microhardness test, a coefficient of friction of 0.01 to 0.80 as measured by ASTM Method D1894, and a surface roughness of 1 micro-inch to 60 micro-inches as measured by the surface roughness test.

22. The method of claim 18, wherein a ratio of adipic acid dihydrazide equivalents to free isocyanate equivalents ranges from 1.01:1 to 1.5:1.

23. The method of claim 18, wherein the aqueous polyurethane resin comprises from 1 to 10 weight % of the reactive hydrazide functional groups based on the total solid weight of the aqueous polyurethane resin, wherein the reactive hydrazide functional groups are represented and calculated as H$_2$N—NH—C(O) with a weight average molecular weight of 59 g/mol.

24. The method of claim 18, wherein the reactive silicone component comprises a reactive silicone emulsion.

* * * * *